US012812064B2

(12) United States Patent
Kim et al.

(10) Patent No.: US 12,812,064 B2
(45) Date of Patent: Nov. 24, 2026

(54) SYSTEM, METHOD, PROGRAM AND RECORDING MEDIUM FOR LOCATING PROJECTION POINT

(71) Applicant: DELTAX CO., LTD., Seoul (KR)

(72) Inventors: Stephen Kim, Incheon (KR); Akmaljon A-Lijon Ugli Palvanov, Seoul (KR); S M Nadim Udd, Seongnam-si (KR); Thai Hoa Huynh, Seoul (KR); Bunyodbek Fazliddin Ugli Ibrokhimov, Incheon (KR); Manoj Padney, Seoul (KR)

(73) Assignee: DELTAX CO., LTD., Seoul (KR)

(*) Notice: Subject to any disclaimer, the term of this patent is extended or adjusted under 35 U.S.C. 154(b) by 95 days.

(21) Appl. No.: 18/900,550

(22) Filed: Sep. 27, 2024

(65) Prior Publication Data

US 2026/0039768 A1 Feb. 5, 2026

(30) Foreign Application Priority Data

Aug. 5, 2024 (KR) ........................ 10-2024-0103882

(51) Int. Cl.

| | |
|---|---|
| ***H04N 5/74*** | (2006.01) |
| ***G06F 3/01*** | (2006.01) |
| ***G06T 7/50*** | (2017.01) |
| ***G06V 10/44*** | (2022.01) |
| ***G06V 40/16*** | (2022.01) |

(52) U.S. Cl.

CPC ............... *H04N 5/74* (2013.01); *G06F 3/013* (2013.01); *G06T 7/50* (2017.01); *G06V 10/44* (2022.01); *G06V 40/161* (2022.01); *G06T 2207/20132* (2013.01); *G06T 2207/30201* (2013.01)

(58) Field of Classification Search

CPC ... H04N 5/74; G06T 7/50; G06T 2207/20132; G06T 2207/30201; G06V 40/161; G06V 10/44; G06F 3/013

See application file for complete search history.

(56) References Cited

U.S. PATENT DOCUMENTS

2017/0169612 A1* 6/2017 Cashen .................... G06T 19/20
2022/0146819 A1* 5/2022 Boyle ................ G02B 27/0093

* cited by examiner

*Primary Examiner* — Yassin Alata

(74) *Attorney, Agent, or Firm* — Maschoff Brennan

(57) ABSTRACT

The projection point locating system includes: an image reception unit which receives an image including a target object to be located at a projection point and a face image of a user; a 3D eye tracking model management unit which generates and trains a 3D eye tracking model for optimally locating the projection point of the target object; an image processing unit which receives the 3D eye tracking model from the 3D eye tracking model management unit, and analyzes a face image of the user and estimates a position and a gaze direction of user's eyes, so as to process the target object such that the target objects appears at optimal coordinates aligned with the position and the gaze direction of the user's eyes; and an image output unit which displays the target object by projecting the target object at the optimal coordinates.

12 Claims, 4 Drawing Sheets

SYSTEM, METHOD, PROGRAM AND RECORDING MEDIUM FOR LOCATING PROJECTION POINT

1. FIELD OF THE INVENTION

The present disclosure relates to a system, a method, a program, and a recording medium for locating a projection point, and more specifically, to a system, a method, a program, and a recording medium for locating a projection point of an object, which is projected onto a transparent display, to an optimal position adapted to a position of user's eyes.

2. DESCRIPTION OF THE PRIOR ART

An augmented reality head up display (AR HUD) system performs a function of overlaying real-time information with a user's field of view.

For example, when navigation information is displayed on a transparent display of the AR HUD system while driving a vehicle, a milestone or a route is necessarily displayed at an accurate position matching a direction of an actual road.

If a projection point of an object is accurate, a user may experience more intuitive and error-free navigation by seeing a position of the real world that matches digital information.

However, regardless of a position of driver's eyes, when the projection point of the object is fixedly represented at a certain point on the transparent display of the AR HUD system, it may cause confusion to the user.

Specifically, when the position of the driver's eyes changes, if the information displayed on the transparent display is not visually aligned with the object in the real world, the interpretation of the information may be incorrect.

For example, when an arrow indicating a specific direction on a road is not adjusted according to the height or position of the driver's eyes, it may indicate another direction that does not match to the actual state, resulting in confusion to the driver.

Therefore, there is a need for a technology capable of locating a projection point of an object, which is projected onto a transparent display, to an optimal position adapted to a position of user's eyes.

SUMMARY OF THE INVENTION

The present disclosure is conceived in consideration of the above-described points, and an object of the present disclosure is to provide a system and a method for locating a projection point of an object, which is projected onto a transparent display, to an optimal position adapted to a position of user's eyes.

To achieve the object of the present disclosure, according to one preferred aspect of the present disclosure, there is provided a projection point locating system including: an image reception unit which receives an image including a target object to be located at a projection point from a first camera, and receives a face image of a user who observes the target object from a second camera; a 3D eye tracking model management unit which generates and trains a 3D eye tracking model for optimally locating the projection point of the target object; an image processing unit which receives the 3D eye tracking model from the 3D eye tracking model management unit, and analyzes a face image of the user who observes the target object and estimates a position and a gaze direction of user's eyes by using the 3D eye tracking model, so as to process the target object such that the target object appears at optimal coordinates aligned with the position and the gaze direction of the user's eyes; and an image output unit which displays the target object, which is processed by the image processing unit, by projecting the target object at the optimal coordinates aligned with the position and the gaze direction of the user's eyes.

In one embodiment, the 3D eye tracking model may be configured by integrating an eyeball tracking model for estimating pixel coordinates (x, y) of the user's eyes, a depth estimation model for estimating a depth (z) corresponding to the pixel coordinates (x, y) of the user's eyes, and a gaze estimation model for estimating the gaze direction of the user's eyes.

In one embodiment, the gaze direction of the user's eyes, which is estimated by the gaze estimation model, may be a yaw direction and a pitch direction.

In one embodiment, the first camera and the second camera may be general cameras that generate a 2D image, and images received by the image reception unit may be 2D images that do not include depth information, and the depth information corresponding to the 2D images may be estimated by the depth estimation model.

In one embodiment, the image processing unit may process the target object to appear at the optimal coordinates aligned with the position and the gaze direction of the user's eyes, by performing: a first operation of detecting the face image of the user who observes the target object in an image transmitted from the image reception unit; a second operation of estimating pixel coordinates (x1, y1) of a left eye of the user and pixel coordinates (x2, y2) of a right eye of the user by analyzing the face image of the user; a third operation of estimating depths (z1, z2) corresponding to the pixel coordinates (x1, y1) of the left eye and the pixel coordinates (x2, y2) of the right eye by using the depth estimation model; a fourth operation of cropping the face image of the user; a fifth operation of estimating gaze directions (yaw, pitch) of the left and right eyes of the user by analyzing the cropped face image of the user; and a sixth operation of estimating real world coordinates indicating the position and the gaze direction of the user's eyes by fusing the pixel coordinates (x1, y1) of the left eye, the pixel coordinates (x2, y2) of the right eye of the user estimated in the second operation, the depths (z1, z2) estimated in the third operation, and the gaze directions (yaw, pitch) of the left and right eyes of the user estimated in the fifth operation.

In one embodiment, the second operation and the fourth operation may be performed in parallel.

In one embodiment, the gaze estimation model may be configured to estimate the gaze direction of the user's eyes based on a gaze tracking network architecture, and the gaze tracking network architecture may include: a backbone network configured to extract features related to the position and the gaze direction of the user's eyes from the cropped image; a first fully connected (FC) layer unit configured to receive the features from the backbone network to calculate a weighted sum for estimating a yaw value for the features and apply non-linear transformation through an activation function; a second FC layer unit configured to receive the features from the backbone network to calculate a weighted sum for estimating a pitch value for the features and apply non-linear transformation through an activation function; a yaw gaze estimation unit configured to convert an output from the first FC layer unit into a probability through a first softmax, and estimate the yaw value through a first composite loss function in which a first cross entropy loss function and a first regression loss function are combined; and a pitch gaze estimation unit configured to convert an output from the second FC layer unit into a probability through a second softmax, and estimate the pitch value through a second composite loss function in which a second cross entropy loss function and a second regression loss function are combined.

In one embodiment, the first regression loss function and the second regression loss function may be mean square error (MSE) functions.

In one embodiment, the yaw gaze estimation unit may be configured to: calculate a bin classification loss between possibilities output through the first softmax and target bin labels based on the first cross entropy loss function; acquire a yaw expectation value based on the possibilities output through the first softmax; and estimate the yaw value by calculating a mean square error for the acquired yaw expectation value based on the first regression loss function and adding the mean square error to the bin classification loss calculated based on the first cross entropy loss function.

In one embodiment, the pitch gaze estimation unit may be configured to: calculate a bin classification loss between possibilities output through the second softmax and target bin labels based on the second cross entropy loss function; acquire a pitch expectation value based on the possibilities output through the second softmax; and estimate the pitch value by calculating a mean square error for the acquired pitch expectation value based on the second regression loss function and adding the mean square error to the bin classification loss calculated based on the second cross entropy loss function.

In one embodiment, the backbone network may be RestNet-50.

To achieve the object of the present disclosure, according to another preferred aspect of the present disclosure, there is provided a projection point locating method for analyzing a face image of a user who observes a target object and estimating a position and a gaze direction of user's eyes so that the target object appears at optimal coordinates aligned with the position and the gaze direction of the user's eyes, in which the projection point locating method may include: a first step of detecting the face image of the user who observes the target object in an image received from a camera; a second step of estimating pixel coordinates (x1, y1) of a left eye of the user and pixel coordinates (x2, y2) of a right eye of the user by analyzing the face image of the user; a third step of estimating depths (z1, z2) corresponding to the pixel coordinates (x1, y1) of the left eye and the pixel coordinates (x2, y2) of the right eye by using a depth estimation model; a fourth step of cropping the face image of the user; a fifth step of estimating gaze directions (yaw, pitch) of the left and right eyes of the user by analyzing the cropped face image of the user; and a sixth step of estimating real world coordinates indicating the position and the gaze direction of the user's eyes by fusing the pixel coordinates (x1, y1) of the left eye, the pixel coordinates (x2, y2) of the right eye of the user estimated in the second step, the depths (z1, z2) estimated in the third step, and the gaze directions (yaw, pitch) of the left and right eyes of the user estimated in the fifth step.

In one embodiment, the second operation and the fourth operation may be performed in parallel.

To achieve the object of the present disclosure, according to still another preferred aspect of the present disclosure, there is provided a computer program including instructions for performing any one of the above-described methods.

To achieve the object of the present disclosure, according to still another preferred aspect of the present disclosure, there is provided a computer-readable recording medium which stores a program including instructions for performing any one of the above-described methods.

According to the projection point locating system according to the present disclosure, eyeball tracking, depth estimation, and gaze tracking are integrated, so that it is possible to accurately render real-time visual overlays within an observer's gaze.

In addition, according to the projection point locating system according to the present disclosure, since an observer maintains alignment with the observer by recalibrating augmentation content as the observer moves, augmentation may be correctly mapped, and accordingly, the object to be observed may seem to be naturally integrated into the physical space.

In addition, when the projection point locating system according to the present disclosure is used, it is possible to improve communication, collaboration, and experience sharing in various application fields such as remote support, educational environment, and professional collaboration.

DETAILED DESCRIPTION OF THE EXEMPLARY EMBODIMENTS

Figure 1:
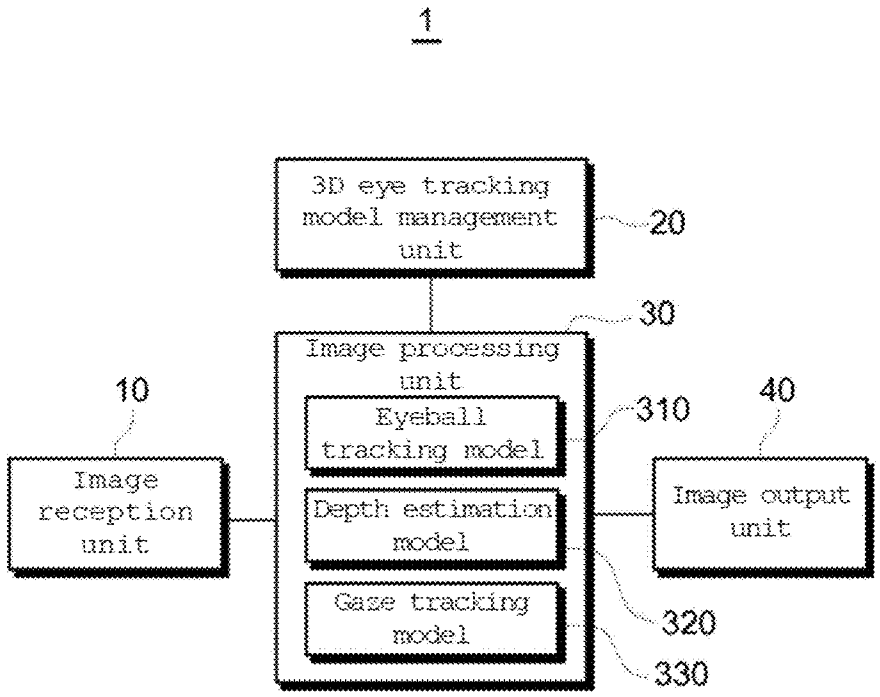
FIG. 1 is a block diagram for explaining a configuration of a projection point locating system according to the present disclosure.

The advantages and features of the present disclosure and a method of achieving the advantages and features will become more apparent from the embodiments described in detail in conjunction with the accompanying drawings. However, the present disclosure is not limited to the disclosed embodiments, but may be implemented in different ways. The embodiments are provided to only complete the present disclosure and to allow those skilled in the art to fully understand the category of the disclosure. The present disclosure is defined by the category of the claims.

The terms used herein are used only for the purpose of describing particular embodiments and are not intended to limit the present disclosure. For example, a component expressed in the singular should be understood as a concept including a plurality of components unless the context clearly indicates only the singular. In addition, the terms "comprise", "have" etc., herein are used to indicate that there are features, numbers, steps, elements, or combination thereof, and the use of these terms should not exclude the possibilities of combination or addition of one or more features, numbers, operations, elements, or a combination thereof.

In addition, unless otherwise defined, all terms used herein, including technical or scientific terms, have the same meaning as commonly understood by one of ordinary skill in the art to which the present disclosure belongs.

Terms such as those defined in commonly used dictionaries should be interpreted as having a meaning consistent with the contextual meaning of the related art and should not be interpreted as either ideal or overly formal in meaning unless explicitly defined in the present disclosure.

Hereinafter, specific embodiments of the present disclosure and their operations will be described with reference to the accompanying drawings. The embodiments described herein are described to help the understanding of the present disclosure, and the technical spirit of the present disclosure is not limited thereby.

The embodiments of the present disclosure relate to a technology for supporting a target object to appear to be naturally integrated into a specific physical space (e.g., a transparent display) based on an artificial intelligence method.

The embodiments of the present disclosure may be applied to, for example, a head up display (AR HUD) system, but are not limited thereto.

Therefore, although in the present disclosure, a specific physical space in which a target object appears is described as a transparent display of the AR HUD system, it should be understood that this is for convenience only and the present disclosure is applicable in environments other than the AR HUD system.

In the following embodiment, a case in which the present disclosure is applied to the AR HUD system will be described as a representative example.

[Projection Point Locating System]

FIGS. 1 to 4 are views for explaining a projection point locating system 1 according to the present disclosure.

First, referring to FIG. 1, the projection point locating system 1 according to the present disclosure includes an image reception unit 10, a 3D eye tracking model management unit 20, an image processing unit 30, and an image output unit 40.

The image reception unit 10 may receive an image including a target object to be located at a projection point and/or a face image of a user (hereinafter, simply abbreviated as an observer) who observes the target object.

For example, the image reception unit 10 may receive images obtained from a first camera that captures the target object and/or a second camera that captures the observer (e.g., a driver).

For example, the images received through the image reception unit 10 may be still images or video images.

For example, the images received through the image reception unit 10 may be 2D images that do not include depth information.

The 3D eye tracking model management unit 20 is configured to generate and train a model for optimally locating the projection point of the object that appears through the image output unit 40 (e.g., a transparent display), and to supply the trained model to the image processing unit 30.

In one embodiment, the 3D eye tracking model management unit 20 is a model for optimally locating the projection point of the object that appears through the image output unit 40, and may generate and train an eyeball tracking model 310, a depth estimation model 320, and a gaze tracking model 330, and may supply the trained model to the image processing unit.

In one embodiment, the eyeball tracking model 310, the depth estimation model 320, and the gaze tracking model 330 may be individually generated and trained, or may be generated and trained as one integrated model. Hereinafter, in the present specification, one model in which the eyeball tracking model 310, the depth estimation model 320, and the gaze tracking model 330 are integrated is referred to as a "3D eye tracking model".

In one embodiment, the 3D eye tracking model management unit 20 may use a public dataset as learning data, or may use gaze tracking data collected by itself under a specific condition as learning data.

In one embodiment, the eyeball tracking model 310, the depth estimation model 320, the gaze tracking model 330, and/or the 3D eye tracking model trained by the 3D eye tracking model management unit 20 may be used while being integrated into various models stored in the image processing unit 30.

In one embodiment, a learning process performed by the 3D eye tracking model management unit 20 may be performed simultaneously with or individually from a projection point locating process performed by the image processing unit 30.

The image processing unit 30 may process an image transmitted from the image reception unit 10 (e.g., a target object image captured by the first camera and/or a face image of the observer captured by the second camera) to detect the target object and/or the face of the observer, and then may perform arithmetic, logic, and input/output operations to allow the target object to appear at an optimal position of the image output unit 40.

In one embodiment, the image processing unit 30 may locate an optimal position of the object, which is to be projected onto the image output unit 40, by using the eyeball tracking model 310, the depth estimation model 320, the gaze tracking model 330, and/or the 3D eye tracking model supplied from the 3D eye tracking model management unit 20.

The image output unit 40 may display the target object at coordinates processed by the image processing unit 30.

In one embodiment, the image output unit 40 may be an augmented reality head up display (AR HUD) system itself or a transparent display that is a component of the AR HUD system.

Figure 2:
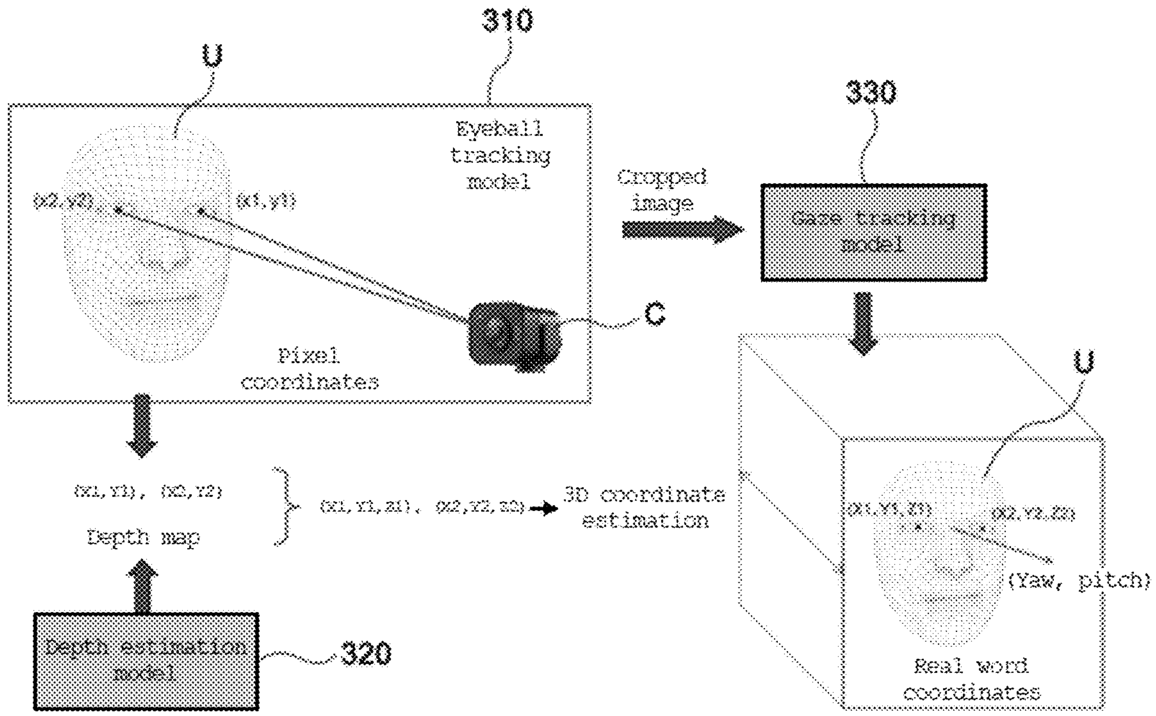
FIG. 2 is a view for explaining a 3D eye tracking model generated and trained by a 3D eye tracking model management unit according to the present disclosure.

FIG. 2 is a view for explaining the 3D eye tracking model generated and trained by the 3D eye tracking model management unit 20 according to the present disclosure.

A second camera C shown in FIG. 2 is directed to the eyeball of the user who observes the target object.

That is, the 3D eye tracking model applied to the projection point locating system 1 according to the present disclosure is a model for estimating a position and a gaze direction of the eyes by analyzing a face image of an observer U obtained from the second camera C.

Specifically, the 3D eye tracking model applied to the projection point locating system 1 according to the present disclosure is a model in which the eyeball tracking model 310, the depth estimation model 320, and the gaze tracking model 330 are integrated.

The 3D eye tracking model tracks 3D coordinates of the eyes through the eyeball tracking model 310 and the depth estimation model 320, and tracks the gaze direction of the eyes through the gaze tracking model 330. In particular, the gaze direction tracked by the 3D eye tracking model according to the present disclosure is a yaw direction and a pitch direction.

The 3D eye tracking model applied to the projection point locating system 1 according to the present disclosure first tracks pixel coordinates (x1, y1) of a left eye of the user and pixel coordinates (x2, y2) of a right eye of the user in a pixel coordinate system using the eyeball tracking model 310.

For example, the eyeball tracking model 310 constituting the 3D eye tracking model may be designed to collect data related to an eye image of the user, may selectively extract only an eye portion from the collected image, and may predict pixel coordinates in the eye image using a deep learning architecture including convolutional neural network (CNN).

For example, the eyeball tracking model 310 constituting the 3D eye tracking model may capture an image transmitted from the image reception unit 10, and may output x and y pixel coordinates of the left and right eyes for each image.

Net, the 3D eye tracking model applied to the projection point locating system 1 according to the present disclosure estimates depths (z1, z2) for the pixel coordinates (x1, y1) of the left eye of the user and the pixel coordinates (x2, y2) of the right eye of the user, which are tracked by the eyeball tracking model 310, by using the eyeball tracking model 320.

For example, the depth estimation model 320 constituting the 3D eye tracking model may accurately label the pixel coordinates (x, y) and the depth (z) of the left and right eyes of the user by using the estimated depth information as described above. The expression "depth information in the image" herein means data that indicates how far each pixel is from the camera in the real world.

In one embodiment, the depth estimation model 320 constituting the 3D eye tracking model may minimize a depth prediction error using a regression analysis loss function including a mean square error (MSE).

For example, the depth estimation model 320 constituting the 3D eye tracking model may adjust the loss function by varying a weight.

Next, the 3D eye tracking model applied to the projection point locating system 1 according to the present disclosure calculates 3D coordinates of the user's eyes by using pixel coordinate (x, y) information about the user's eyes estimated through the eyeball tracking model 310 and depth (z) information estimated through the depth estimation model 320.

Next, the 3D eye tracking model applied to the projection point locating system 1 according to the present disclosure performs a cropping operation on the corresponding image to extract only an image around the user's eyes from the corresponding image. Through this process, it is possible to save a processing time and resources of the eyeball tracking model 330 by removing background noise and extracting only related data. In particular, in a 3D eye tracking technology according to the present disclosure, real-time gaze tracking is an essential requirement, and thus such improvement in processing speed is very important.

Next, the 3D eye tracking model applied to the projection point locating system 1 according to the present disclosure estimates the gaze direction of the user's eyes using the gaze tracking model 330. In particular, the gaze direction estimated by the 3D eye tracking model according to the present disclosure is a yaw direction and a pitch direction.

Figure 3A:
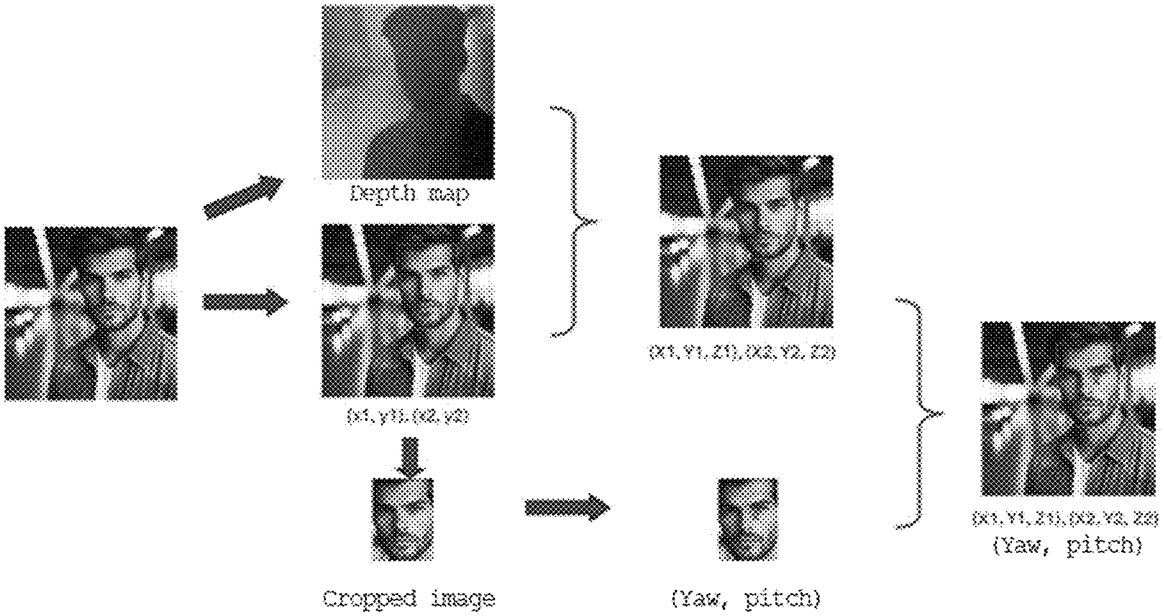
FIGS. 3*a* and 3*b* are views for explaining operations of the projection point locating system according to the present disclosure.
Figure 3B:
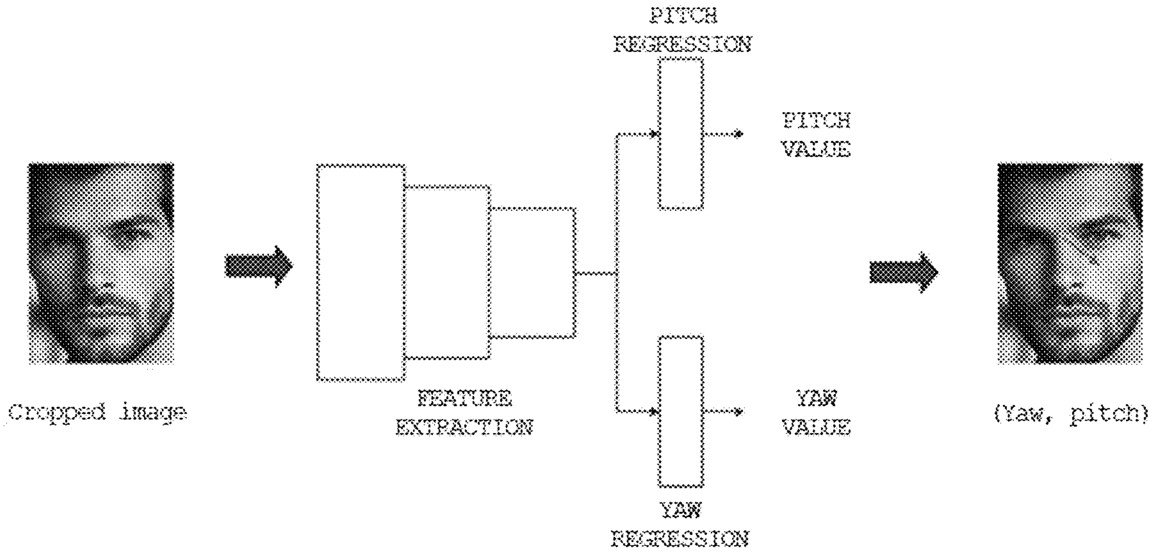

In this regard, referring to FIGS. 3*a* and 3*b* together, the gaze tracking model 330 constituting the 3D eye tracking model estimates the gaze direction of the user's eyes in the cropped image to optimize a direct gaze of the observer together with the pixel coordinates (x, y) information of the user's eyes estimated through the eyeball tracking model 310 and the depth (z) information estimated through the depth estimation model 320.

Figure 4:
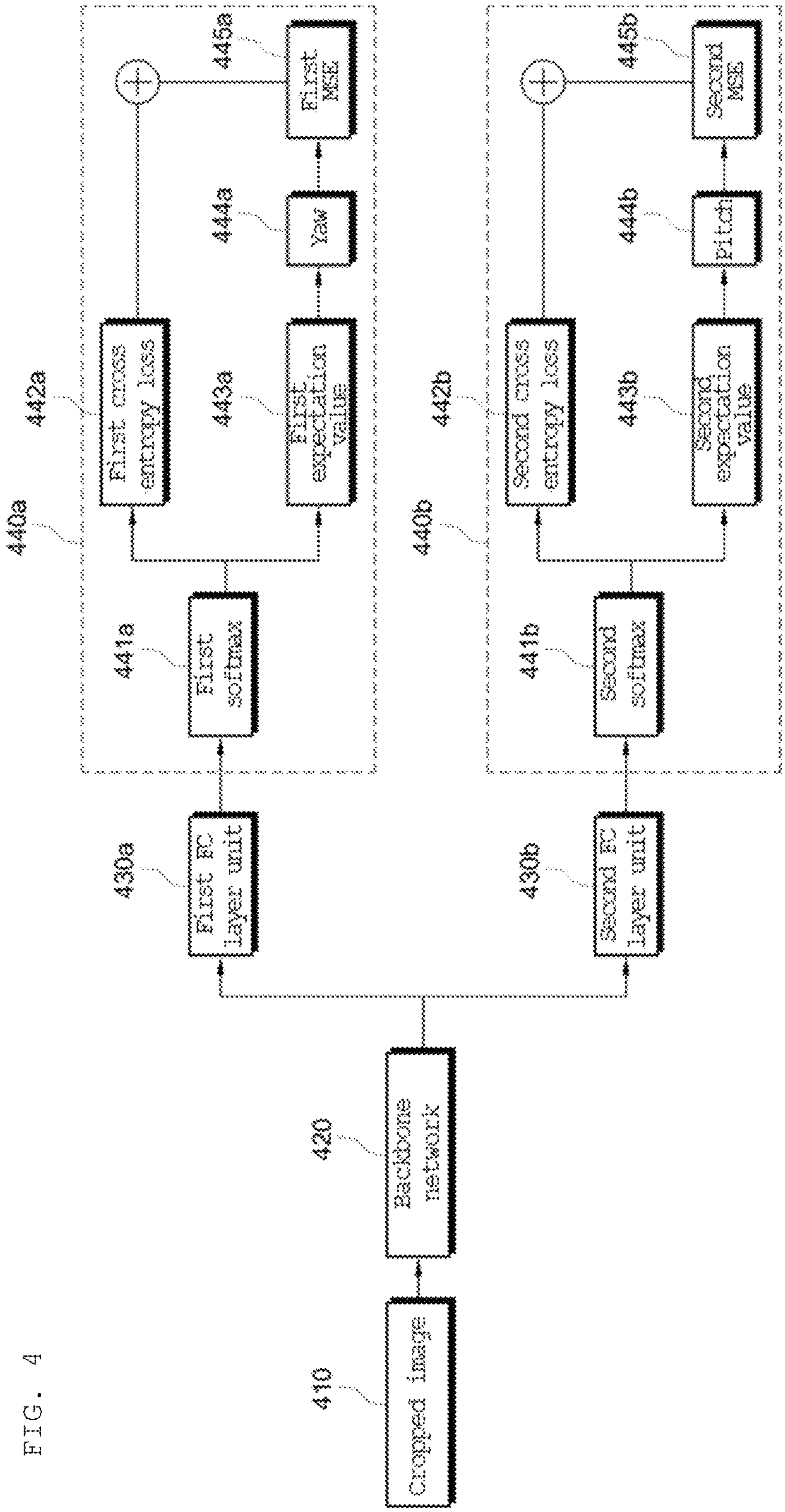
FIG. 4 is a view for explaining a gaze tracking network architecture that is the basis of a gaze tracking model adapted to the 3D eye tracking model according to the present disclosure.

FIG. 4 is a view for explaining a gaze tracking network architecture that is the basis of the gaze tracking model 330 adapted to the 3D eye tracking model according to the present disclosure.

Referring to FIG. 4, the gaze tracking network architecture may include: a backbone network 420 configured to extract features related to the position and the gaze direction of the user's eyes from a cropped image 410; a first fully connected (FC) layer unit 430*a* configured to receive features from the backbone network 420 to calculate a weighted sum for estimating a yaw value for the features and apply non-linear transformation through an activation function; a second FC layer unit 430*b* configured to receive the features from the backbone network 420 to calculate a weighted sum for estimating a pitch value for the features and apply non-linear transformation through an activation function; a yaw gaze estimation unit 440*a* configured to convert an output from the first FC layer unit 430*a* into a probability through a first softmax 441*a*, and estimate the yaw value through a first composite loss function in which a first cross entropy loss function 442*a* and a first MSE function 445 are combined; and a pitch gaze estimation unit 442*b* configured to convert an output from the second FC layer unit 430*b* into a probability through a second softmax 441*b*, and estimate the pitch value through a second composite loss function in which a second cross entropy loss function 442*b* and a second MSE function 445*b* are combined.

In one embodiment, the first MSE function 445*a* and the second MSE function 445*b* may use other regression loss functions, and for example, an MAE function, a hub loss function, or the like may be used.

In one embodiment, ResNet-50 may be used as the backbone network 420.

For example, the yaw gaze estimation unit 442*a* may be configured to: calculate a bin classification loss between possibilities output through the first softmax 441*a* and target bin labels based on the first cross entropy loss function 442*a*; acquire a yaw expectation value based on the possibilities output through the first softmax 441*a*; and estimate the yaw value by calculating a mean square error for the acquired yaw expectation value based on the first MSE function 445*a* and adding the mean square error to the bin classification loss calculated based on the first cross entropy loss function 442*a*.

For example, the pitch gaze estimation unit 440*b* may be configured to: calculate a bin classification loss between possibilities output through the second softmax 441*b* and target bin labels based on the second cross entropy loss function 442*b*; acquire a pitch expectation value based on the possibilities output through the second softmax 441*b*, and estimate the pitch value by calculating a mean square error for the acquired pitch expectation value based on the second MSE function 445*b* and adding the mean square error to the bin classification loss calculated based on the second cross entropy loss function 442*b*.

In the gaze tracking network architecture that is the basis of the gaze tracking model 330 applied to the 3D eye tracking model according to the present disclosure, the entropy loss functions 442*a* and 442*b* are defined as follows.

$$H(y, p) = -\sum_{i} y_i \log p_i$$

In addition, in the gaze tracking network architecture that is the basis of the gaze tracking model 330 applied to the 3D eye tracking model according to the present disclosure, the MSE functions 445*a* and 445*b* are defined as follows.

$$MSE(y, p) = \frac{1}{N}\sum_{0}^{N}(y - p)^2$$

In the gaze tracking network architecture that is the basis of the gaze tracking model 330 applied to the 3D eye tracking model according to the present disclosure, the entropy loss functions 442*a* and 442*b* and the MSE functions 445*a* and 445*b* are defined as follows.

$$CLS(y, p) = H(y, p) + \beta \cdot MSE(y, p)$$

In this case, CLS is a composite loss function, p is a predicted value, y is a ground truth value, and β is a regression coefficient.

According to the gaze tracking network architecture according to the present disclosure, unlike the related art in which all gaze angles (yaw and pitch) are regressed together in one fully-connected (FC) layer, the yaw value and the pitch value are individually predicted through two FC layers (i.e., the first FC layer 430*a* and the second FC layer 430*b*), so that network learning related to the gaze direction of the user's eyes may be improved.

Since these two FC layers (i.e., the first FC layer 430*a* and the second FC layer 430*b*) share the same convolution layers in the backbone network 420 and use individual composite loss functions for each gaze angle (yaw and pitch), there are two signals backpropagated through the network, so that network learning related to the gaze direction of the user's eyes may be further improved.

[Projection Point Locating Method]

Figure 5:
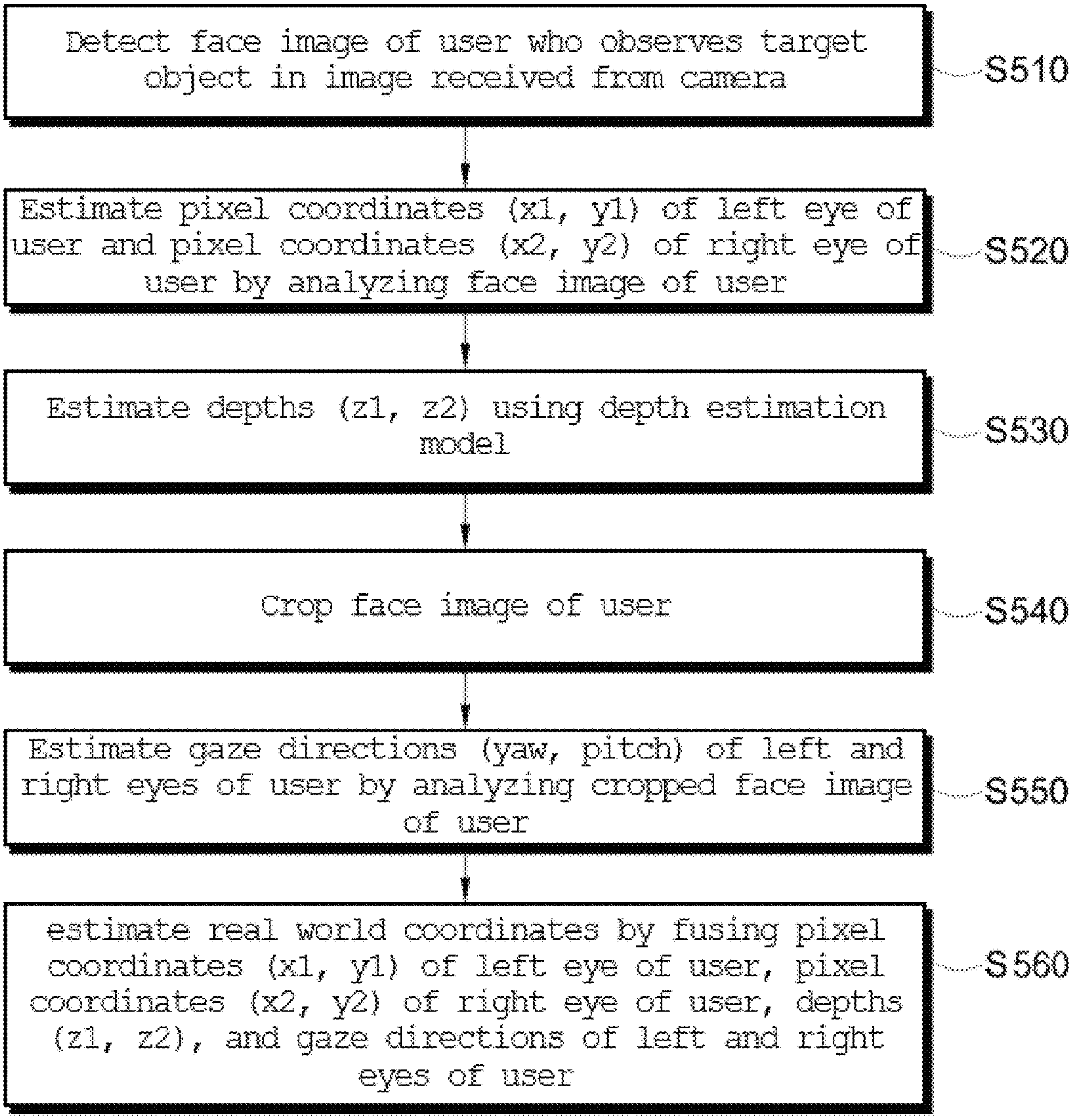
FIG. 5 is a flowchart for explaining a projection point locating method according to the present disclosure.

FIG. 5 is a view for explaining a projection point locating method according to the present disclosure.

The projection point locating method according to the present disclosure is a method for analyzing a face image of a user who observes a target object and estimating a position and a gaze direction of user's eyes so that the target object appears at optimal coordinates aligned with the position and the gaze direction of the user's eyes.

Referring to FIG. 5, the projection point locating method according to the present disclosure may include: a first step S510 of detecting the face image of the user who observes the target object in an image received from a camera; a second step S520 of estimating pixel coordinates (x1, y1) of a left eye of the user and pixel coordinates (x2, y2) of a right eye of the user by analyzing the face image of the user; a third step S530 of estimating depths (z1, z2) corresponding to the pixel coordinates (x1, y1) of the left eye and the pixel coordinates (x2, y2) of the right eye by using a depth estimation model; a fourth step S540 of cropping the face image of the user; a fifth step S550 of estimating gaze directions (yaw, pitch) of the left and right eyes of the user by analyzing the cropped face image of the user; and a sixth step S560 of estimating real world coordinates indicating the position and the gaze direction of the user's eyes by fusing the pixel coordinates (x1, y1) of the left eye, the pixel coordinates (x2, y2) of the right eye of the user estimated in the second step, the depths (z1, z2) estimated in the third step, and the gaze directions (yaw, pitch) of the left and right eyes of the user estimated in the fifth step.

In one embodiment, the second step S520 of estimating the pixel coordinates (x1, y1) of the left eye of the user and the pixel coordinates (x2, y2) of the right eye by analyzing the face image of the user and the fourth step S540 of cropping the face image of the user may be performed in parallel.

According to the projection point locating method according to the present disclosure, the projection point of the target object that is projected may be located at an optimal position adapted to the position of the user's eyes.

In addition, those skilled in the art will understand that a program implementing the 3D eye tracking model applied to the present disclosure may be recorded in a computer-readable recording medium. Examples of the computer-readable recording medium include a ROM, a RAM, a CD-ROM, a magnetic tape, a floppy disk, an optical data storage device, and the like, and also include a recording medium implemented in the form of a carrier wave (e.g., transmission through the Internet). In addition, the computer-readable recording medium may be distributed to the computer system connected through a network, and computer-readable codes may be stored and executed in a distributed manner. In addition, functional programs, codes, and code segments for implementing the present embodiment may be easily inferred by programmers in the related art to which the present embodiment pertains.

The above description illustrates the technical idea of the present disclosure, and it will be understood by those skilled in the art to which the present disclosure belongs that various changes and modifications may be made without departing from the scope of the essential characteristics of the present disclosure. Therefore, the embodiments disclosed herein are not used to limit the technical idea of the present disclosure, but to explain the present disclosure, and the scope of the technical idea of the present disclosure is not limited by those embodiments. The scope of protection of the present disclosure should be defined by the following claims, and all technical spirits falling within the scope equivalent thereto should be construed as being included in the scope of the present disclosure.

What is claimed is:

1. A projection point locating system comprising:

an image reception unit which receives an image including a target object to be located at a projection point from a first camera, and receives a face image of a user who observes the target object from a second camera;

a 3D eye tracking model management unit which generates and trains a 3D eye tracking model for optimally locating the projection point of the target object;

an image processing unit which receives the 3D eye tracking model from the 3D eye tracking model management unit, and analyzes the face image of the user who observes the target object and estimates a position and a gaze direction of the user's eyes by using the 3D eye tracking model, so as to process the target object such that the target object appears at optimal coordinates aligned with the position and the gaze direction of the user's eyes; and an image output unit which displays the target object, which is processed by the image processing unit, by projecting the target object at the optimal coordinates aligned with the position and the gaze direction of the user's eyes;

wherein the 3D eye tracking model is configured by integrating an eyeball tracking model for estimating pixel coordinates (x, y) of the user's eyes, a depth estimation model for estimating a depth (z) corresponding to the pixel coordinates (x, y) of the user's eyes, and a gaze estimation model for estimating the gaze direction of the user's eyes;

wherein the gaze direction of the user's eyes, which is estimated by the gaze estimation model, is a yaw direction and a pitch direction;

wherein the image processing unit processes the target object to appear at the optimal coordinates, which are aligned with the position and the gaze direction of the user's eyes, by performing:

a first operation of detecting the face image of the user who observes the target object in an image transmitted from the image reception unit;

a second operation of estimating pixel coordinates (x1, y1) of a left eye of the user and pixel coordinates (x2, y2) of a right eye of the user by analyzing the face image of the user;

a third operation of estimating depths (z1, z2) corresponding to the pixel coordinates (x1, y1) of the left eye and the pixel coordinates (x2, y2) of the right eye by using the depth estimation model;

a fourth operation of cropping the face image of the user;

a fifth operation of estimating gaze directions (yaw, pitch) of the left and right eyes of the user by analyzing the cropped face image of the user; and a sixth operation of estimating real world coordinates indicating the position and the gaze direction of the user's eyes by fusing the pixel coordinates (x1, y1) of the left eye, the pixel coordinates (x2, y2) of the right eye of the user estimated in the second operation, the depths (z1, z2) estimated in the third operation, and the gaze directions (yaw, pitch) of the left and right eyes of the user estimated in the fifth operation.

2. The projection point locating system of claim 1, wherein the first camera and the second camera are general cameras that generate a 2D image, and images received by the image reception unit are 2D images that do not include depth information, and the depth information corresponding to the 2D images is estimated by the depth estimation model.

3. The projection point locating system of claim 1, wherein the second operation and the fourth operation are performed in parallel.

4. The projection point locating system of claim 1, wherein the gaze estimation model is configured to estimate the gaze direction of the user's eyes based on a gaze tracking network architecture, and the gaze tracking network architecture includes:

a backbone network configured to extract features related to the position and the gaze direction of the user's eyes from the cropped image;

a first fully connected (FC) layer unit configured to receive the features from the backbone network to calculate a weighted sum for estimating a yaw value for the features and apply non-linear transformation through an activation function;

a second FC layer unit configured to receive the features from the backbone network to calculate a weighted sum for estimating a pitch value for the features and apply non-linear transformation through an activation function;

a yaw gaze estimation unit configured to convert an output from the first FC layer unit into a probability through a first softmax, and estimate the yaw value through a first composite loss function in which a first cross entropy loss function and a first regression loss function are combined; and a pitch gaze estimation unit configured to convert an output from the second FC layer unit into a probability through a second softmax, and estimate the pitch value through a second composite loss function in which a second cross entropy loss function and a second regression loss function are combined.

5. The projection point locating system of claim 4, wherein the first regression loss function and the second regression loss function are mean square error (MSE) functions.

6. The projection point locating system of claim 5, wherein the yaw gaze estimation unit is configured to:

calculate a bin classification loss between possibilities output through the first softmax and target bin labels based on the first cross entropy loss function;

acquire a yaw expectation value based on the possibilities output through the first softmax; and estimate the yaw value by calculating a mean square error for the acquired yaw expectation value based on the first regression loss function and adding the mean square error to the bin classification loss calculated based on the first cross entropy loss function.

7. The projection point locating system of claim 6, wherein the pitch gaze estimation unit is configured to:

calculate a bin classification loss between possibilities output through the second softmax and target bin labels based on the second cross entropy loss function;

acquire a pitch expectation value based on the possibilities output through the second softmax; and estimate the pitch value by calculating a mean square error for the acquired pitch expectation value based on the second regression loss function and adding the mean square error to the bin classification loss calculated based on the second cross entropy loss function.

8. The projection point locating system of claim 4, wherein the backbone network is RestNet-50.

9. A projection point locating method for analyzing a face image of a user who observes a target object and estimating a position and a gaze direction of user's eyes so that the target object appears at optimal coordinates aligned with the position and the gaze direction of the user's eyes, the projection point locating method comprising:

a first step of detecting the face image of the user who observes the target object in an image received from a camera;

a second step of estimating pixel coordinates (x1, y1) of a left eye of the user and pixel coordinates (x2, y2) of a right eye of the user by analyzing the face image of the user;

a third step of estimating depths (z1, z2) corresponding to the pixel coordinates (x1, y1) of the left eye and the pixel coordinates (x2, y2) of the right eye by using a depth estimation model;

a fourth step of cropping the face image of the user;

a fifth step of estimating gaze directions (yaw, pitch) of the left and right eyes of the user by analyzing the cropped face image of the user; and a sixth step of estimating real world coordinates indicating the position and the gaze direction of the user's eyes by fusing the pixel coordinates (x1, y1) of the left eye, the pixel coordinates (x2, y2) of the right eye of the user estimated in the second step, the depths (z1, z2) estimated in the third step, and the gaze directions (yaw, pitch) of the left and right eyes of the user estimated in the fifth step.

10. The projection point locating method of claim 9, wherein the second step and the fourth step are performed in parallel.

11. A non-transitory computer-readable recording medium which stores a program including instructions for performing the method of claim 10.

12. A non-transitory computer-readable recording medium which stores a program including instructions for performing the method of claim 10.

* * * * *